Oct. 24, 1967   N. C. MILLER   3,348,685
FILTER APPARATUS AND FILTER AID FEEDING AND CONTROLLING SYSTEM
Filed Sept. 2, 1964
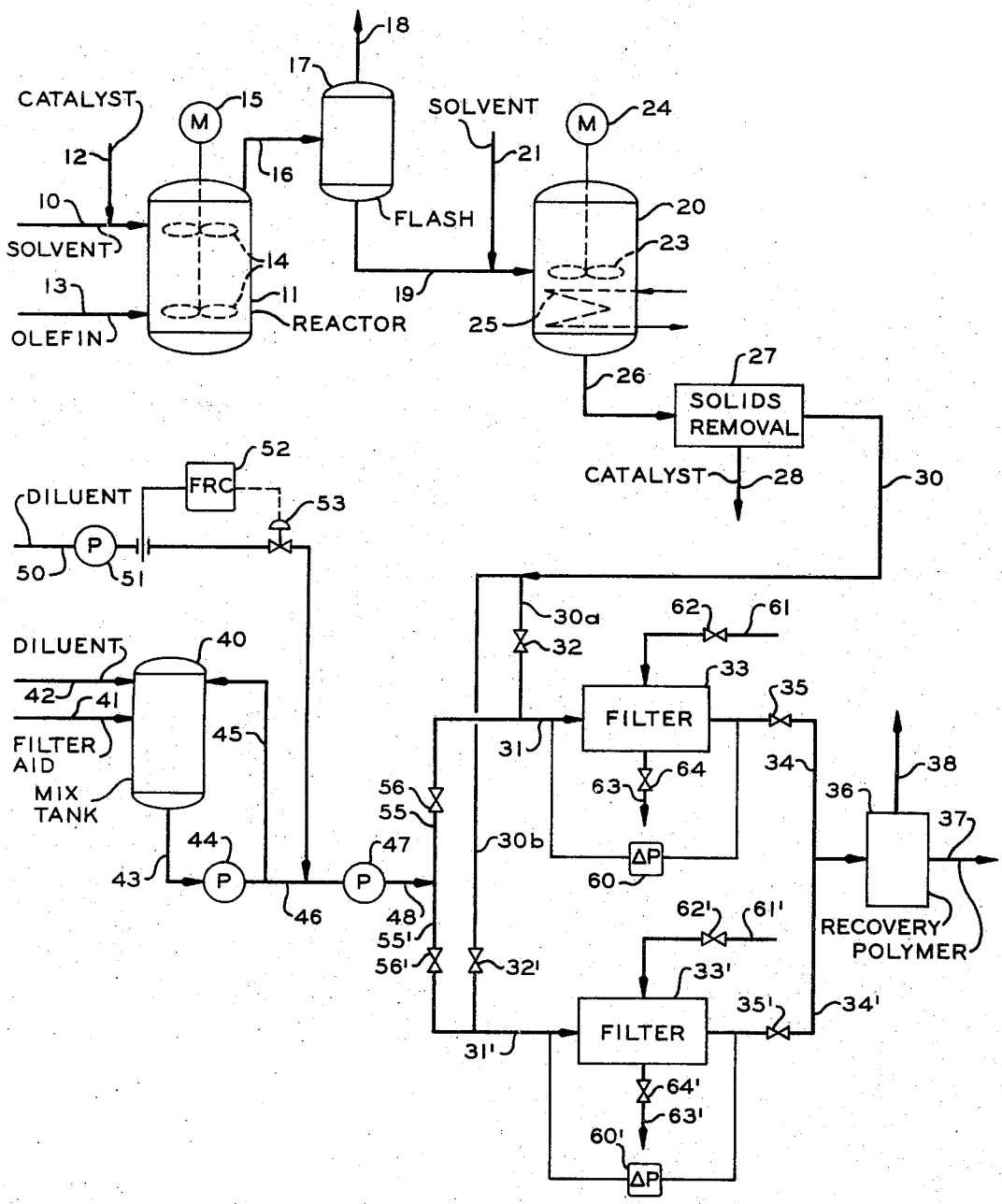
INVENTOR.
N.C. MILLER
BY Young & Quigg
ATTORNEYS United States Patent Office 3,348,685
Patented Oct. 24, 1967

3,348,685
FILTER APPARATUS AND FILTER AID FEEDING
AND CONTROLLING SYSTEM
Neil C. Miller, Villa Park, Ill., assignor to Phillips
Petroleum Company, a corporation of Delaware
Filed Sept. 2, 1964, Ser. No. 393,873
1 Claim. (Cl. 210—101)

ABSTRACT OF THE DISCLOSURE

A system for controlling the introduction of filter aid and diluent to the inlet of a filter, comprising an inlet conduit extending from a mixing tank and having first and second pumps in series therein, the latter being a constant delivery pump. A bypass conduit returns a portion of the material from the outlet of the first pump to the mixing tank. Additional diluent is added to the inlet of the second pump through a conduit means having a pump and a flow controller therein.

---

This invention relates to the blending of fluids. In another aspect it relates to the control of the addition of filter aid to a material to be filtered. In another aspect it relates to the filtering of catalyst residues from solutions of polymers.

It is common practice to add filter aid materials, such as diatomaceous earth, to many filters in order to improve the filtering action. A coating of filter aid is deposited on the filter elements initially. Additional filter aid is often added during the actual filtering operation in order to increase the effective life of the filter. This additional filter aid is commonly added to the material being filtered. The additional filter aid tends to prevent solids from forming coatings on the filter elements, which coatings would increase the filter resistance and shorten the effective life of the filter. The filter aid tends to maintain a higher porosity in the coating on the element and also aids in the actual filtering operation. In this manner, the pressure drop across the filter tends to increase at a slower rate so as to increase the effective life of the filter.

The rate at which filter aid should be added to the material to be filtered is a function of the pressure drop across the filter element. If the rate of pressure drop is changed, it is necessary to adjust the rate at which the filter aid is added. The proper control of the addition of filter aid has presented a number of problems. It is difficult to operate suitable pumping mechanism at variable rates for the purpose of changing the rate of addition of filter aid. In accordance with the present invention, a blending system is provided which permits filter aid, or other material, to be added to a fluid stream at any preselected rate. As applied to filtering operations, a slurry of filter aid and diluent is introduced into the inlet of a conduit which has a constant delivery pump positioned therein. This assures that material will be transmitted through the conduit at a constant rate. A second stream of diluent is added to the inlet of the conduit, and a flow control system is employed so that the second diluent stream is added at a constant preselected rate. The flow system is operated so that the diluent stream flows through the conduit at the rate at which it is introduced into the conduit. The slurry stream, on the other hand, is introduced at a variable rate which is equal to the difference between the total flow through the conduit and the flow of diluent to the inlet of the conduit. By varying the rate at which the diluent is introduced, it is evident that the rate of delivery of filter aid can be controlled in a desired manner.

Accordingly, it is an object of this invention to provide an improved system for controlling the addition of filter aid to a filtering operation.

Other objects, advantages and features of the invention should become apparent from the following detailed description, taken in conjunction with the accompanying drawing which is a schematic flow diagram of an embodiment of the blending system of this invention.

Referring now to the drawing in detail, a system is shown for the production and recovery of polymer. A solvent, such as cyclohexane, is introduced through a conduit 10 into a reactor 11. This solvent is supplied from a suitable storage tank, not shown, and is delivered to the reactor at a generally constant rate. A catalyst, such as chromium oxide deposited on a silica-alumina base, is added to the solvent from a conduit 12. This catalyst is usually supplied in the form of a slurry in solvent. A suitable 1-olefin feed, such as ethylene or a mixture of ethylene with a higher 1-olefin, is passed to reactor 11 through a conduit 13. Reactor 11 is provided with stirrers 14 which are driven by a motor 15. Reactor 11 can be operated in the manner described in U.S. Patent 2,825,721 in order to polymerize the olefin feed to produce a normally solid polymer. The reaction is carried out at such temperatures and pressures as to maintain the resulting polymer in solution in the solvent.

The reactor effluent is removed through a conduit 16 which communicates with the inlet of a flash tank 17. The unreacted olefin is flashed from the reactor effluent and removed through a conduit 18. The liquid reactor effluent from flash tank 17 is directed through a conduit 19 to a vessel 20. Additional solvent can be added to vessel 20 from a conduit 21 in order to adjust the polymer concentration to a suitable value for subsequent filtration operations. Vessel 20 is provided with a stirrer 23 which is driven by a motor 24. Sufficient heat can be added to vessel 20 by a heating means 25 to retain the solution at a sufficiently high temperature to maintain the polymer in solution. The polymer solution is passed from vessel 20 by a conduit 26 to a solids removal zone 27. Zone 27 can be a centrifuge, filter or other liquid-solids separation means from which a substantial amount of catalyst residue is removed through a line 28.

A liquid stream is removed from zone 27 through a conduit 30. This stream normally contains from three to six percent by weight of polymer in hydrocarbon solvent. The stream also contains a small amount of catalyst residue which is to be removed by a subsequent filtering operation. A conduit 30a, which has a valve 32 therein, communicates between conduit 30 and a conduit 31, the latter communicating with the inlet of a filter 33. The resulting filtrate is removed through a conduit 34, which has a valve 35 therein, and passed to the inlet of a polymer recovery zone 36. The polymer is recovered from the solvent in zone 36 by any conventional procedure. The resulting polymer is removed through a conduit 37, and the solvent is removed through a conduit 38.

The filter elements of filter 33, which can be a leaf filter, for example, are coated initially with a filter aid material, such as diatomaceous earth. During the actual filtering operation, additional filter aid is added to the inlet stream to filter 33 as may be desired. A slurry of filter aid and diluent, which advantageously is the solvent employed in the polymerization, is formed in a mix tank 40. The filter aid is supplied to tank 40 through a conduit 41, and the diluent is supplied through a conduit 42. Tank 40 is sufficiently large to provide an ample supply of slurry for addition to the filter system. Slurry is withdrawn from tank 40 through a conduit 43 which communicates with the inlet of a pump 44. A conduit 45 communicates between the outlet of pump 44 and mix tank 40. Thus, slurry is circulated continuously through conduits 43 and 45. This circulation serves to maintain the filter aid in suspension. However, a stirring element can be added to tank 40 if desired to provide further mixing. A conduit 46 communicates between the outlet of pump 44 and the inlet of a constant delivery pump 47. A conduit 48 communicates between the outlet of pump 47 and a conduit 55. Conduit 55, which has a respective valve 56 therein, communicates with conduit 31.

Additional diluent is introduced into the system through a conduit 50 which communicates between a source of diluent, not shown, and conduit 46. A pump 51 is provided in conduit 50 to direct diluent to the inlet of constant delivery pump 47. A flow recorder-controller 52 adjusts a valve 53 in conduit 50 so as to maintain the flow through conduit 50 constant at any preselected value, which is established by the set point of controller 52.

The blending system is operated so that pump 47 passes a greater volume of material than is passed through conduit 50. Pump 44 passes a sufficient volume of material so that a sufficient pressure is maintained at the upstream end of conduit 46 to prevent flow from conduit 50 from backing into conduit 45. It should thus be evident that the amount of filter aid introduced into conduit 48 is determined by the rate at which diluent is passed through conduit 50. If the diluent flow through conduit 50 is decreased, for example, additional flow of filter aid slurry passes through conduit 46 to maintain a constant flow through conduit 48. This increases the amount of filter aid that is introduced into conduit 48. An increase in flow of diluent through conduit 50, on the other hand, results in greater recirculation of filter aid through conduit 45 so that the amount of filter aid introduced into conduit 48 is decreased.

The polymer filter system is provided with a second filter 33' in parallel with filter 33. The conduits and valves associated with filter 33' are identical to those associated with filter 33 and are designated by like primed reference numerals. By providing two filters, it is possible to utilize one while the other is being cleaned after its filtering capacity has been spent. When filter 33 is being employed, valves 32 and 35 are open and valves 32' and 35' are closed. Prior to the time that the polymer solution is introduced into filter 33, filter aid is passed to the inlet of filter 33 from tank 40 to precoat the filter elements. Thereafter, the material to be filtered is introduced into the filter and the flow of filter aid is continued. This filtering operation can be continued until the filter becomes saturated with catalyst residue. The efficiency of the filter can be determined by measuring the pressure differential thereacross, a meter 60 is provided for this purpose. When it is time to clean filter 33 the polymer solution is diverted to filter 33'. The cleaning of filter 33 is accomplished by circulating a wash liquid to the filter through a conduit 61, which has a valve 62 therein. The catalyst residue washed from the filter is removed through a drain conduit 63, which has a valve 64 therein.

As a specific example of the operation of this invention it is assumed that conduit 30 passes a cyclohexane solution containing approximately five weight percent of olefin polymer. This polymer solution is passed at a rate of approximately 150 gallons per minute and at a temperature of approximately 300° F. The filter aid, diatomaceous earth, is added to the polymer solution at a rate of approximately 0.3 pound of diatomaceous earth per pound of polymer in solution. The material in mix tank 40 comprises approximately 16 percent by weight of diatomaceous earth. The relative flows through conduits 46 and 50 are adjusted by flow controller 52 so that the desired amount of diatomaceous earth is introduced into the filtration system. Prior to the start of each filtration cycle, the leaves of the filter are coated with about one-eighth inch of filter aid. The filtration cycle is continued until the filter is filled with catalyst, which condition can be observed visually by a sight glass, not shown, on the filter case. Alternatively, the cycle should be stopped if the measured pressure differential exceeds about 30 pounds per square inch. It is desirable to operate so that the pressure differential increases at a uniform rate and reaches the maximum value at the time the filter is filled. If the pressure differential should tend to increase too rapidly, the set point of controller 52 is changed to increase the rate of filter aid addition. Obviously, the rates of addition and maximum pressures will vary with different types of materials and filter configurations.

While this invention has been described in conjunction with the introduction of filter aid into a filtration system wherein catalyst residues are removed from solutions of olefin polymers, it should be evident that the invention is by no means limited thereto.

What is claimed is:

Filtering apparatus comprising a filter; first conduit means communicating with the inlet of said filter to supply a material to be filtered; a mixing tank; means to introduce a filter aid into said mixing tank; means to introduce a diluent into said mixing tank; second conduit means communicating between said mixing tank and the inlet of said filter to supply diluent and filter aid from said mixing tank to said filter; a source of diluent; third conduit means communicating between said source of diluent and said second conduit means to add additional diluent to said second conduit means; a constant delivery pump in said second conduit means between the junction with said third conduit means and said filter to pass material to said filter at a first constant rate; a second pump in said third conduit means; a flow controller in said third conduit means downstream from said second pump to maintain a constant flow of diluent through said third conduit means at a second rate which is less than said first constant rate; a third pump in said second conduit means between said mixing tank and the junction with said third conduit means; and fourth conduit means communicating between the outlet of said third pump and said mixing tank, said third pump being operated at a rate which is greater than the difference between said first constant rate and said second rate so as to return to said mixing tank through said fourth conduit means a portion of the filter aid and diluent passed by said third pump and whereby there is maintained at the outlet of said third pump a sufficient pressure to prevent diluent flowing through said third conduit means from entering said fourth conduit means.

References Cited

UNITED STATES PATENTS

| 2,934,448 | 4/1960 | Patton | 137—566 X |
| 3,023,764 | 3/1962 | Dooley et al. | 137—98 |
| 3,116,242 | 12/1963 | Mertz | 210—101 X |
| 3,200,105 | 8/1965 | Barber et al. | 210—75 X |
| 3,214,369 | 10/1965 | Felix | 210—75 X |

FOREIGN PATENTS 1,279,345  11/1961  France.

SAMIH N. ZAHARNA, *Primary Examiner.*